United States Patent
Saraille et al.

(10) Patent No.: US 8,614,711 B2
(45) Date of Patent: Dec. 24, 2013

(54) METHOD AND DEVICES FOR PROJECTING TWO-DIMENSIONAL PATTERNS ONTO COMPLEX SURFACES OF THREE-DIMENSIONAL OBJECTS

(75) Inventors: Francis Saraille, Merville (FR); Henri Jeannin, Plaisance du Touch (FR)

(73) Assignee: Airbus Operations SAS, Toulouse (FR)

( * ) Notice: Subject to any disclaimer, the term of this patent is extended or adjusted under 35 U.S.C. 154(b) by 940 days.

(21) Appl. No.: 12/445,223

(22) PCT Filed: Oct. 12, 2007

(86) PCT No.: PCT/FR2007/001668
§ 371 (c)(1),
(2), (4) Date: Apr. 10, 2009

(87) PCT Pub. No.: WO2008/043919
PCT Pub. Date: Apr. 17, 2008

(65) Prior Publication Data
US 2010/0103174 A1    Apr. 29, 2010

(30) Foreign Application Priority Data
Oct. 12, 2006   (FR) ...................................... 06 54246

(51) Int. Cl.
*G06T 15/10*   (2011.01)
*G06T 15/20*   (2011.01)

(52) U.S. Cl.
USPC .......................................................... 345/427

(58) Field of Classification Search
None
See application file for complete search history.

(56) References Cited

U.S. PATENT DOCUMENTS

| 5,255,352 A * | 10/1993 | Falk ............................... 345/582 |
| 5,436,027 A | 7/1995 | Offer |
| 5,490,080 A | 2/1996 | Jarrige et al. |
| 5,566,286 A | 10/1996 | Minami et al. |
| 6,415,050 B1 * | 7/2002 | Stegmann et al. ............ 382/154 |
| 2006/0104484 A1 * | 5/2006 | Bolle et al. .................... 382/115 |
| 2007/0083383 A1 * | 4/2007 | Van Bael et al. .................. 705/1 |

FOREIGN PATENT DOCUMENTS

EP           0 593 340         4/1994

* cited by examiner

*Primary Examiner* — Ke Xiao
*Assistant Examiner* — Kyle Zhai
(74) *Attorney, Agent, or Firm* — Oblon, Spivak, McClelland, Maier & Neustadt, L.L.P.

(57) ABSTRACT

A method and device optimizing projection of a two-dimensional pattern onto a three-dimensional object surface. After defining an original curve on the two-dimensional pattern and a projection curve on the three-dimensional object surface, a point of the pattern is selected. The abscissa and ordinate of the projection of the selected point are determined according to the abscissa and ordinate of the selected point and first and second projection ratios, respectively. A projection plane, including the point of the projection curve determined by the abscissa of the projection of the selected point, is then determined. The projection of the selected point onto the three-dimensional object surface is determined according to the ordinate of the projection of the selected point, the intersection of the surface of the three-dimensional object with the plane of projection, and the projection curve.

16 Claims, 7 Drawing Sheets

METHOD AND DEVICES FOR PROJECTING TWO-DIMENSIONAL PATTERNS ONTO COMPLEX SURFACES OF THREE-DIMENSIONAL OBJECTS

The present invention relates to decorating three-dimensional objects and more particularly to a method and devices for assisting in modeling decorations of three-dimensional objects on the basis of a two-dimensional representation of these decorations.

Projection of a two-dimensional image onto a three-dimensional object is commonly used in numerous industries for decorating these objects. The complexity of this problem varies according to the nature of the three-dimensional object and the nature of the projection surface. Thus, although the projection of a two-dimensional image onto a continuous surface of small dimensions, such as the external surface of a beverage can, does not pose any particular problem, the projection of a logo, symbol or name onto the external surface of an airplane poses numerous problems. In particular, the task is made difficult by the complexity of the shape of the projection surface, the scaling factor between the reproduced image and the original image, and the presence of certain particular elements on which certain parts, such as the cabin windows, of the two-dimensional image to be reproduced must be painted or not painted.

The general purpose of decorating airplanes is to apply the commercial image of the airline companies, and it often comprises painting names, signs and logos in a manner that must be performed flawlessly. The adaptation of the model of the airline company to the particular shapes of each airplane is generally based on experience and on an empirical analysis. The validation of this adaptation is often associated with the construction of mockups. This process has numerous disadvantages, particularly in terms of costs and time needed.

European Patent EP 0593340 discloses a method and a device for assisting in decorating a three-dimensional object. The method consists in representing a three-dimensional model of the decorated object by a tracing of the decoration. It then consists in locating, on the object, on the basis of the 3D model, at least certain characteristic points of the said tracing, in order to position, for example, adhesive tape for outlining the decoration, or stencils or precut decorative elements, etc. This invention is also applicable in particular to decorating an airplane by distinctive logos, letters or signs on the external surface of this aircraft.

Although this method makes it possible to model decorations that are to be reproduced on an airplane, transformation of the two-dimensional image to a three-dimensional image adapted to the surface of the airplane is achieved by conic projection relative to target points, followed by adaptation of the projection.

Figure 1:
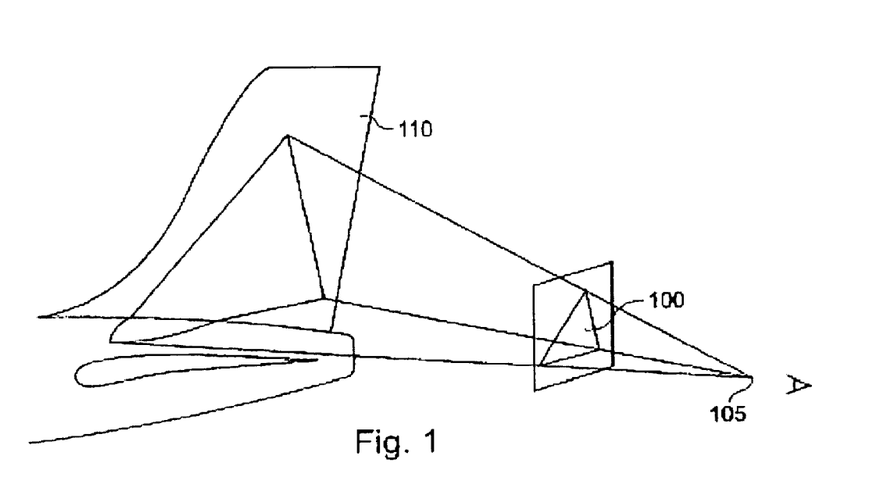
FIG. 1 illustrates an example of conic projection making it possible to reproduce a two-dimensional image on the external surface of an airplane.

FIG. 1 illustrates an example of conic projection for reproducing a two-dimensional image on the external surface of an airplane. The projection of image 100 from projection point 105 onto the vertical tail assembly of an airplane 110 reveals problems related to conic projection onto a tapered part of the external surface of an airplane, such as the junction between the vertical tail assembly and the fuselage.

A need therefore exists for directly obtaining a projection of a two-dimensional image onto a three-dimensional object having a complex surface, without the need for adaptation, especially on tapered zones.

The invention makes it possible to solve at least one of the problems discussed in the foregoing.

The object of the invention is therefore a method for projecting a two-dimensional pattern onto the surface of a three-dimensional object, this method comprising the following steps, defining at least one original curve on the two-dimensional pattern and at least one projection curve on the surface of the three-dimensional object, the original and projection curves each having a point of origin;

determining at least one projection ratio;

selecting a point of the two-dimensional pattern;

determining at least one abscissa of the projection of the selected point according to at least one abscissa of the selected point and according to the projection ratio;

determining the ordinate of the projection of the selected point according to the ordinate of the selected point and according to the projection ratio;

determining an ordinate plane comprising the point of the projection curve determined by the abscissa of the projection of the selected point; and determining the projection of the selected point onto the surface of the three-dimensional object according to the ordinate of the projection of the selected point, the intersection of the surface of the three-dimensional object with the ordinate plane and the projection curve.

The invention thus makes it possible to optimize the transfer of the two-dimensional pattern onto the surface of a three-dimensional object by reducing the deformations related to the tapered parts of the surface of the three-dimensional object.

Advantageously, a second ratio is used to transfer the two-dimensional pattern with different ratios according to each direction.

Preferably the tangents at the selected points are also transferred to improve the quality of the transferred image.

According to a first embodiment, the ordinate plane is normal to the projection curve.

According to a second embodiment, the ordinate plane is parallel to a reference plane.

According to another embodiment, the ordinate plane is defined by a second point and by a predetermined direction. The second point is advantageously the projection of a second abscissa of the selected point according to a second original curve. Preferably, the ordinate of the projection of the selected point is defined in particular by the ratio of the distances between the selected point and the points of the two original curves determined by the two abscissas of the selected point.

According to a particular embodiment, at least one of the selected points is projected according to a particular one of the three embodiments and at least one other selected point is projected according to the other particular embodiment. The projection of the two-dimensional pattern is therefore adapted to the nature of the surface of the three-dimensional object.

According to yet another particular embodiment, the two-dimensional pattern may be transformed before being projected onto the surface of the three-dimensional object or in the course of projection. In this way the two-dimensional pattern may be adapted to particular needs.

The three-dimensional object may be a real object or a digital object such as a model used in a computer-assisted design software.

Another object of the invention is a device comprising means adapted to employing each of the steps of the method described in the foregoing.

Another object of the invention is a computer program comprising instructions adapted to employing each of the steps of the method described in the foregoing.

Other advantages, objectives and characteristics of the present invention become evident from the detailed description provided hereinafter by way of non-limitative example, referring to the attached drawings, wherein:

FIG. 7, comprising FIGS. 7a and 7b, presents an example of projection of two-dimensional image points onto the surface of a vertical tail assembly of an airplane, according to a first and a second embodiment;

FIG. 9, comprising FIGS. 9a and 9b, presents an example of projection of two-dimensional image points onto the surface of a vertical tail assembly of an airplane, according to a third embodiment; and, FIG. 10, comprising FIGS. 10a and 10b, illustrates a mechanism for projecting tangents.

The following description is based on the example of the external decoration of an airplane, but it should be understood that the method and the devices according to the invention are applicable to decorating all three-dimensional objects on the basis of a two-dimensional representation of the decoration.

Figure 2:
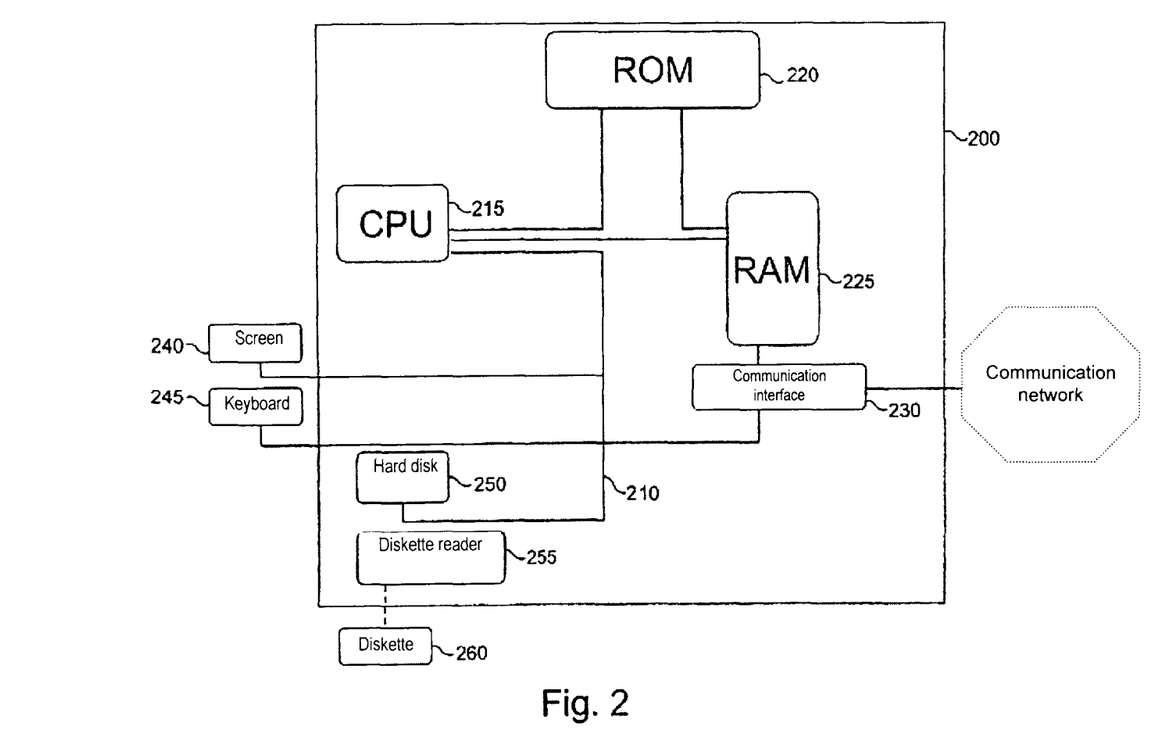
FIG. 2 shows an example of an apparatus making it possible to implement the invention.

FIG. 2 illustrates an example of an apparatus 200 adapted to employing the invention. As an example, apparatus 200 is a microcomputer or a workstation that may or may not be capable of being connected to a communication network. Apparatus 200 is provided with a communication bus 210, to which there are preferably connected:

a central processing unit 215, such as a microprocessor denoted by CPU (Central Processing Unit);

a non-volatile memory 220, which may contain programs for employing the invention, denoted by ROM (Read Only Memory);

a volatile memory 225, which after boot-up contains the executable code of the method according to the invention as well as registers capable of recording variables and parameters necessary for employing the invention, denoted by RAM (Random Access Memory); and, a communication interface 230 connected to a communication network, the interface being capable of transmitting and receiving data.

Optionally, apparatus 200 may also be provided with the following components:

a screen 240 for viewing data and/or for functioning as a graphical user interface that will be able to interact with the programs according to the invention, by means of a keyboard 245, which may or may not be supplemented by another means, such as a pointing device, for example a mouse, a light pen or even a touch screen;

a hard disk 250 or a storage memory such as a compact flash card, which may contain the programs according to the invention as well as data used or produced during employment of the invention; and, a disk reader 255 (or any other removable data medium) capable of receiving a diskette 260 and therein reading or writing data that have been processed or will be processed according to the invention.

The communication bus permits communication and interoperability between the different elements included in apparatus 200 or connected thereto. The representation of the bus is not limitative and, in particular, the central unit is capable of communicating instructions to any element of apparatus 200 directly or by way of another element of apparatus 200.

Diskettes 260 may be replaced by any information medium such as, for example, a compact disk (CD ROM), which may or may not be rewritable, a ZIP disk or a memory card, and in general by an information storage means that may be read by a microcomputer or a microprocessor, which may or may not be integrated in the apparatus, and which may be removable and capable of storing in memory one or more programs whose execution permits employment of the method according to the invention.

The executable code permitting the apparatus to employ the invention may be stored equally well in read-only memory 220, on hard disk 250 or on a removable digital medium such as, for example, a diskette 260 as described in the foregoing. According to one variant, it will be possible for the executable code of the programs to be received by way of the communication network, via interface 230, to be stored in one of the storage means of apparatus 200, such as hard disk 250, before being executed.

Central unit 215 is capable of commanding and directing the execution of instructions or portions of software code or of programs according to the invention, such instructions being stored in one of the aforesaid storage means. During boot-up, the program or programs stored in a non-volatile memory, for example on hard disk 250 or read-only memory 220, are transferred into random-access memory 225, which then contains the executable code of the program or programs according to the invention as well as registers for storing in memory the variables and parameters necessary for employment of the invention.

It is appropriate to note that the apparatus containing the device according to the invention may also be a programmed apparatus. This apparatus then contains the code of the computer program or programs for example resident in an integrated circuit for specific applications (Application Specific Integrated Circuit or ASIC).

Figure 3:
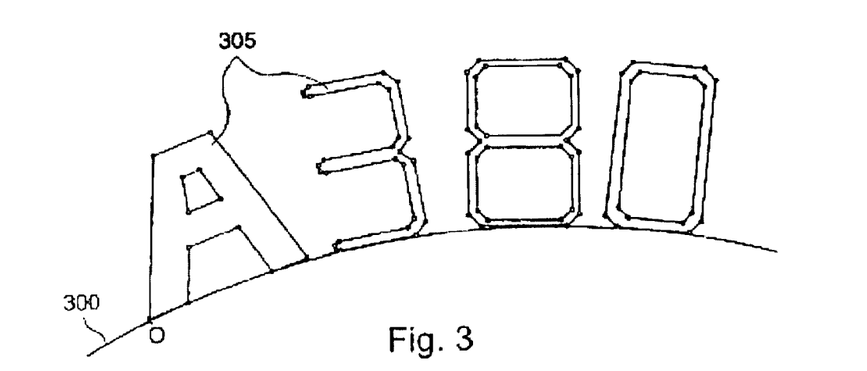
FIG. 3 presents an example of a two-dimensional image to be reproduced on the surface of a three-dimensional object.

FIG. 3 represents a two-dimensional image to be reproduced on the surface of a three-dimensional object, such as the tail assembly illustrated in FIG. 1. The two-dimensional image, or source image, comprises a curve 300 and a point of origin O belonging to this curve. Curve 300, referred to as original curve in the description hereinafter, is considered as being the abscissa axis of the frame of reference in which there are defined the points forming the image to be reproduced on the surface of the three-dimensional object. The original curve is preferably related to the two-dimensional image to be reproduced, as illustrated in FIG. 3, but it may be any curve whatsoever. In the presented example, the image to be reproduced comprises the letters "A380". The ordinate axis is preferably chosen as being orthogonal to the original curve at the abscissa point under consideration.

Figure 4:
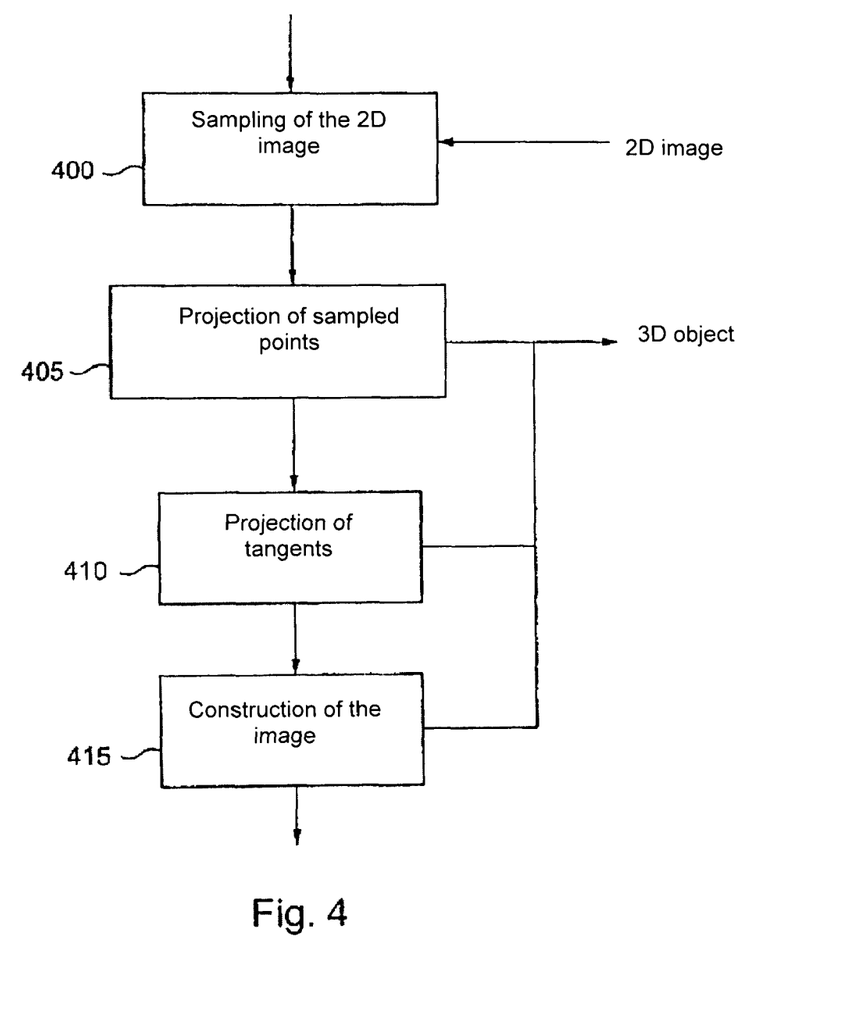
FIG. 4 illustrates certain general steps of the algorithm for projecting a two-dimensional image onto the surface of a three-dimensional object.

The method according to the invention may be broken down into the following four steps, illustrated in FIG. 4, sampling of the two-dimensional image to be reproduced on the surface of the three-dimensional object (step 400);

projection of the sampled points onto the surface of the three-dimensional object (step 405);

projection of tangents at the sampled points onto the surface of the three-dimensional object (step 410); and construction of the image on the surface of the three-dimensional object from the projected points and tangents (step 415).

It is appropriate to note that the step of transfer of tangents at the sampled points is not indispensable, but it generally ensures that the quality of the projected image is enhanced.

The two-dimensional source image is preferably composed of curves and points. The points may be projected successively according to the process presented hereinafter in the description. The curves, generally constituting the boundary between two different colors, are advantageously sampled by defining a chord error and a maximum distance between consecutive points. The points resulting from sampling and possibly also the tangents to the curves at these points are projected onto or plotted on the surface of the three-dimensional object in order to reconstitute the curves by smoothing of projected points. The projection of tangents according to the same process makes it possible to sharpen the projection of the source image. Sampling may or may not be automatic.

Other sampling methods may be used. For example, sampling may be accomplished in such a way that each sampled point corresponds to a conspicuous or singular point of the source image. A point is considered to be conspicuous or singular if it corresponds to an extremum or if it characterizes a discontinuity in curvature, such as an abrupt change of direction.

For the sake of clarity, it is considered in the description hereinafter that the coordinate units are equivalent in all directions, or in other words, in particular, that the distance between the origin and the point with coordinates (1, 0) is equal to the distance between the point of origin and the point with coordinates (0, 1). Nevertheless, it is possible to use different units.

Several methods may be used to transfer the sampled points of the two-dimensional image to the surface of the three-dimensional object.

Figure 5:
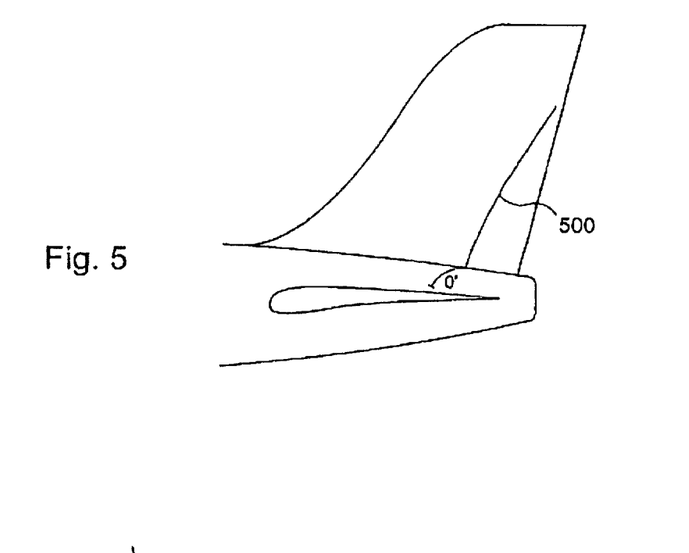
FIG. 5 presents the positioning of a projection curve on the surface of a three-dimensional object, in this case a vertical tail assembly of an airplane.

According to a first embodiment, a projection curve is defined on the surface of the three-dimensional object. This curve, comprising an origin O', is used as reference axis to represent the abscissa of the projection of sampled points of the source image onto the surface of the three-dimensional object. This projection curve may be similar to the original curve, it may be similar with a different scale or it may be different. FIG. 5 illustrates a representation of an airplane on which the projection curve (500) has been traced. An example of the algorithm according to this first embodiment is represented schematically in FIG. 6.

Figure 6:
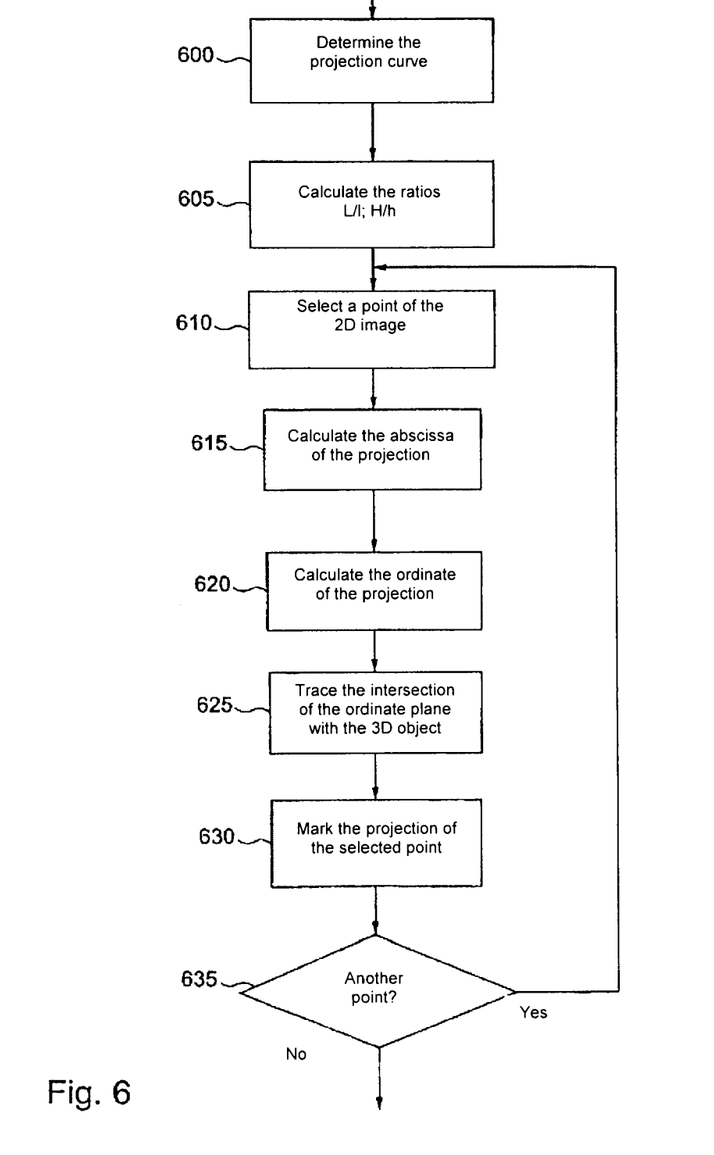
FIG. 6 illustrates certain steps of the algorithm for projecting two-dimensional image points to be reproduced onto the surface of a three-dimensional object according to a first and a second embodiment.

After the projection curve has been determined on the surface of the three-dimensional object (step 600), the ratio of lengths of the original curve (l) and projection curve (L) is calculated (step 605). By default, the ratio of heights of the source image and projected image is equal to that of the lengths of the original and projection curves. Nevertheless, the user may determine a different ratio or enter the desired height of the projected image to permit calculation of the ratio of heights of the source image (h) and of the projected image (H). The height H is preferably a distance measured on the surface of the three-dimensional object and not a mathematical distance calculated in three-dimensional space. If the projection curve is identical to the original curve, the ratio is equal to unity and does not have to be calculated. Alternatively, the ratio may be determined by the user. There is selected a source image point, preferably a sampled point of the source image having the coordinates (x, y) (step 610). The abscissa of the projection of this point is then calculated (step 615). The abscissa of the projection of the selected point is advantageously defined by the following relationship, $$x' = x \cdot \frac{L}{l}$$

where x is the abscissa of the selected point of the original image according to the original curve and x' is the abscissa of the projection of the selected point onto the three-dimensional object according to the projection curve. The ratio L/l may be omitted if the ratio is equal to 1 or may be replaced by a variable determined by the user.

Similarly, the ordinate of the projection of the selected point is calculated (step 620). By analogy with the abscissa, the ordinate of the projection of the selected point is advantageously defined by the following relationship, $$y' = y \cdot \frac{H}{h} \text{ or } y' = y \cdot \frac{L}{l}$$

where y is the ordinate of the selected point of the original image, preferably according to a line orthogonal to the original curve at x, and y' is the ordinate of the projection of the selected point onto the surface of the three-dimensional object according to the intersection of an ordinate plane with the surface of the three-dimensional object. By default, the ratio of heights of the source image and projected image is equal to that of the lengths of the original and projection curves (H/h=L/l). Thus it is not systematically necessary to know the height of the image projected onto the three-dimensional object. Once again, the ratio may be determined by the user.

The ordinate curve is determined, for a projected point having abscissa x', by the intersection of a projection plane or ordinate plane passing through the point of the projection curve having abscissa x' with the surface of the three-dimensional object. According to this first embodiment, the ordinate plane is defined as being normal to the projection curve at x'.

To determine the projection of the selected point, it is therefore necessary to plot the value x' on the projection curve starting from its origin O', to determine the intersection of the plane normal to the projection curve at this point with the surface of the three-dimensional object, and to plot the value of the ordinate on the curve formed by this intersection (steps 625 and 630).

After the projection of the selected point has been marked on the three-dimensional object, a test is performed to determine whether all points of the sampling have been projected (step 635). If not all points of the sampling have been projected, a new point is selected (step 610) and steps 615 to 635 are repeated.

Figure 7:
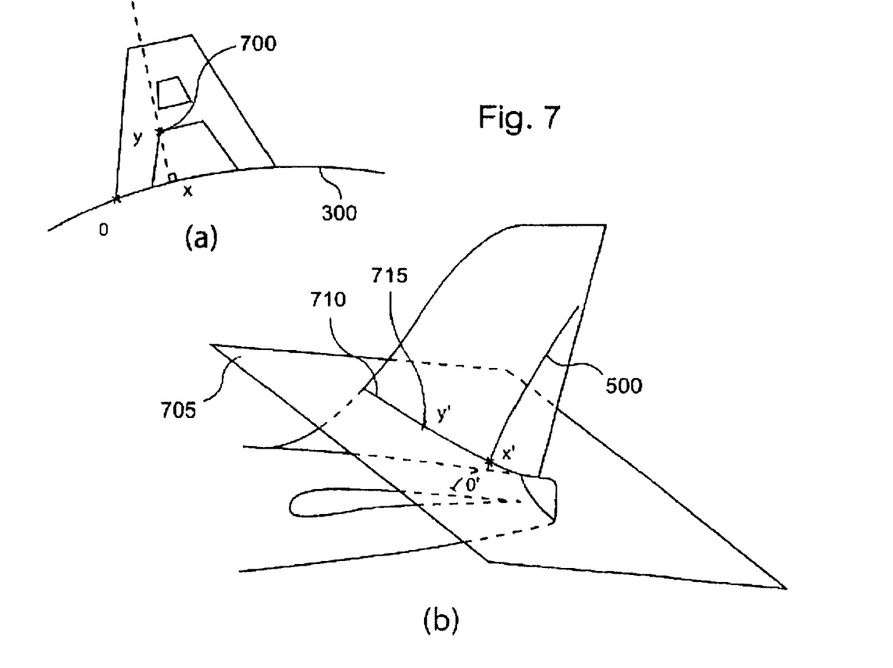

FIG. 7, comprising FIGS. 7a and 7b, illustrates the projection of an original image point illustrated in FIG. 3 onto a vertical tail assembly according to projection curve 500 and according to the first embodiment. FIG. 7a repeats part of FIG. 3, with the addition of the references and coordinates of the point to be projected. As indicated, point 700 has the coordinates (x, y) in the frame of reference formed by the original curve and by the line orthogonal to this curve at abscissa point x. FIG. 7b repeats a part of FIG. 5. After the abscissa x' of the projection of point 700 has been determined as indicated in the foregoing, the value x' is plotted on projection curve 500. There is traced the intersection (710) between the plane (700) normal to curve 500 at the abscissa point x' of this curve with the surface of the three-dimensional object, in this case the vertical tail assembly. The ordinate y' of the projection of point 700 is plotted on intersection curve 710. Point 715 having coordinates (x', y') is the projection of point 700 onto the surface of the three-dimensional object.

According to a second embodiment, ordinate plane 705 is determined as being the plane parallel to a reference plane, this plane parallel to a reference plane passing through the abscissa point x' of the projection curve. The same reference plane is used for projecting all of the sampling points or some of these points. The reference plane is advantageously chosen according to the shape of the three-dimensional object and the orientation of the text, logo or symbols to be projected. Typically, the reference plane is orthogonal or parallel to the axis of the fuselage of an airplane.

Figure 8:
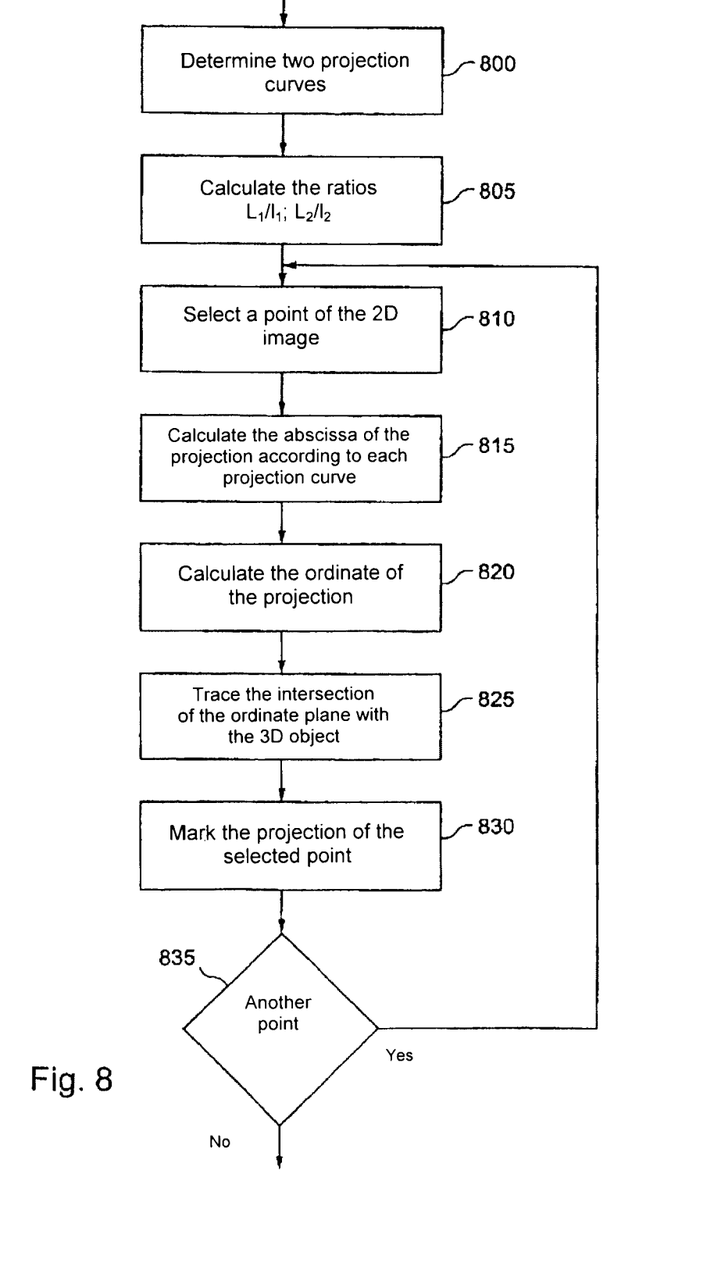
FIG. 8 illustrates certain steps of the algorithm for projecting two-dimensional image points to be reproduced on the surface of a three-dimensional object according to a third embodiment.

According to a third embodiment, the ordinate plane is determined by two points of the surface of the three-dimensional object and a predetermined direction. This direction may be defined automatically according to the nature of the surface of the three-dimensional object, or it may be given by the user. For this purpose, two original curves are defined on the two-dimensional image to be projected, for example a first original curve associated with the minimal y values and a second original curve associated with the maximal y values. Each original curve comprises an origin ($O_1$ and $O_2$). Similarly, two projection curves are defined on the surface of the three-dimensional object. Each projection curve comprises an origin ($O_1'$ and $O_2'$). These two curves are preferably the lower and upper limits of the projection of the two-dimensional image onto the surface of the three-dimensional object. FIG. 8 illustrates certain steps of an example of the algorithm according to this third embodiment.

After two projection curves have been determined on the surface of the three-dimensional object, onto which surface the two-dimensional image is to be projected (step 800), the ratio of the lengths of the first original curve ($I_1$) and of the first projection curve ($L_1$) and the ratio of the lengths of the second original curve ($I_2$) and of the second projection curve ($L_2$) are calculated (step 805). There is selected a source image point, preferably a sampled point of the source image (step 810). The abscissa of the projection of this point is then calculated for each of the two projection curves (step 815). The abscissas of the projections of the selected point are advantageously defined by the following relationships, $$x_1' = x_1 \cdot \frac{L_1}{l_1}; x_2' = x_2 \cdot \frac{L_2}{l_2}$$

where $x_1$ is the abscissa of the selected point of the original image according to the first original curve, $x_2$ is the abscissa of the selected point of the original image according to the second original curve, $x_1'$ is the abscissa of the projection of the selected point onto the three-dimensional object according to the first projection curve, $x_2'$ is the abscissa of the projection of the selected point onto the three-dimensional object according to the second projection curve, $l_1$ is the length of the first original curve, $l_2$ is the length of the second original curve, $L_1$ is the length of the first projection curve and $L_2$ is the length of the second projection curve.

The abscissa $x_1$ is preferably determined as being the orthogonal projection of the selected point onto the first original curve (as in the first and second embodiments). The abscissa $x_2$ is preferably determined by the intersection, with the second projection curve, of the line passing through the selected point and through the point of the first original curve having abscissa $x_1$.

The ordinate of the selected point is advantageously determined as being the ratio of the distance between the selected point and the point of the first original curve having abscissa $x_1$ to the distance between the point of the first original curve having abscissa $x_1$ and the point of the second original curve having abscissa $x_2$. The ordinate of the selected point may therefore be expressed by the following relationship, where Pt is the selected point, $X_1$ is the point of the first original curve having abscissa $x_1$ and $X_2$ is the point of the second original curve having abscissa $x_2$.

There is calculated the ordinate of the projection of the selected point (step 820). The ordinate of the projection of the selected point is advantageously defined by the following relationship, $$y' = y \cdot \frac{D}{h}$$

where y is the ordinate of the selected point determined in the foregoing, y' is the ordinate of the projection of the selected point onto the three-dimensional object according to the intersection of an ordinate plane with the three-dimensional object, h is the height of the original image and D is the distance between the points of the first and second projection curves having the respective abscissas $x_1'$ and $x_2'$ on the surface of the three-dimensional object. D therefore represents the distance between these points according to the intersection of the three-dimensional object and of the plane normal to the surface of this object passing through the points of the first and second projection curves having the respective abscissas $x_1'$ and $x_2'$. The value y' therefore represents the distance between the point of the first projection curve having abscissa $x'_1$, and the projection of the selected point onto the ordinate curve.

The ordinate curve is determined, for a point having abscissa $x_1'$ on the first projection curve and for a point having abscissa $x_2'$ on the second projection curve, by the intersection, with the surface of the three-dimensional object, of an ordinate plane passing through these two points and having a predetermined direction.

To determine the projection of the selected point, it is therefore necessary to plot the value $x_1'$ on the first projection curve, to plot the value $x_2'$ on the second projection curve (according to the origins $O_1'$ and $O_2'$), to determine the intersection, with the surface of the three-dimensional object, of the plane passing through these two points according to the predetermined direction, and to plot the value of ordinate y' on the curve formed by this intersection (steps 825 and 830).

After the projection of the selected point has been marked on the surface of the three-dimensional object, a test is performed to determine whether all points of the sampling have been projected (step 835). If not all points of the sampling have been projected, a new point is selected (step 810) and steps 815 to 835 are repeated.

Figure 9:
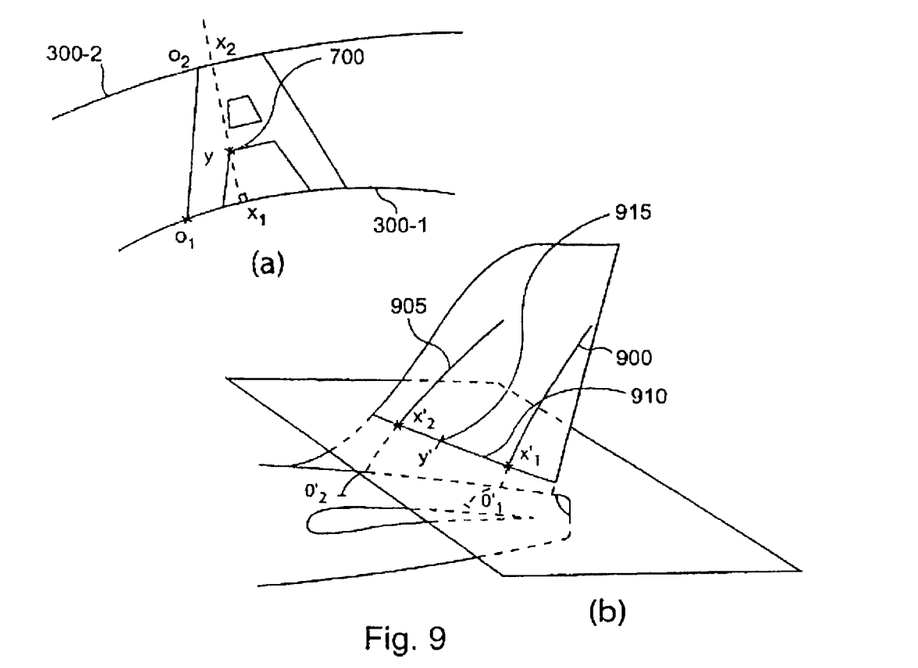

FIG. 9, comprising FIGS. 9a and 9b, illustrates the projection of an original image point illustrated in FIG. 3 onto a vertical tail assembly according to two projection curves. FIG. 9a, in common with FIG. 7a, repeats part of FIG. 3, with the addition of the references and coordinates of the point to be projected. As illustrated, two original curves (300-1 and 300-2) are used. The selected point is point 700, defined by the values $x_1$, $x_2$ and y. FIG. 9b illustrates the two projection curves 900 and 905. After the abscissa $x_1'$ of the projection of point 700 according to the first projection curve has been determined as indicated in the foregoing, the value $x_1'$ is plotted on projection curve 900 relative to the origin $O_1'$. Similarly, after the abscissa $x_2'$ of the projection of point 700 according to the second projection curve has been determined, the value $x_2'$ is plotted on projection curve 905 relative to the origin $O_2'$. There is traced the intersection (910) between the plane (915) passing through the points of the projection curves marked $x_1'$ and $x_2'$ and having a predetermined direction with the surface of the three-dimensional object, in this case the vertical tail assembly. The ordinate y' of the projection of point 700 is plotted on the curve formed by intersection 910. Point 915 is the projection of point 700 onto the surface of the three-dimensional object according to the third embodiment.

The choice of type of projection according to the first, second and third embodiments is related to the type of pattern to be projected and to the nature of the surface of the three-dimensional object onto which the two-dimensional pattern is projected.

As mentioned in the foregoing, a supplementary step of transfer of tangents is advantageously performed. According to this step, preferably at least two tangents are projected for each sampled point of the source image. Each tangent is advantageously determined by the point of tangency, or in other words by the sampled point and a second point chosen in any manner on the tangent, preferably close to the sampled point. The projection of this second point according to the method described in the foregoing makes it possible to construct the projection of the tangent onto the surface of the three-dimensional object, thus permitting construction of the projection of the source image.

Figure 10:
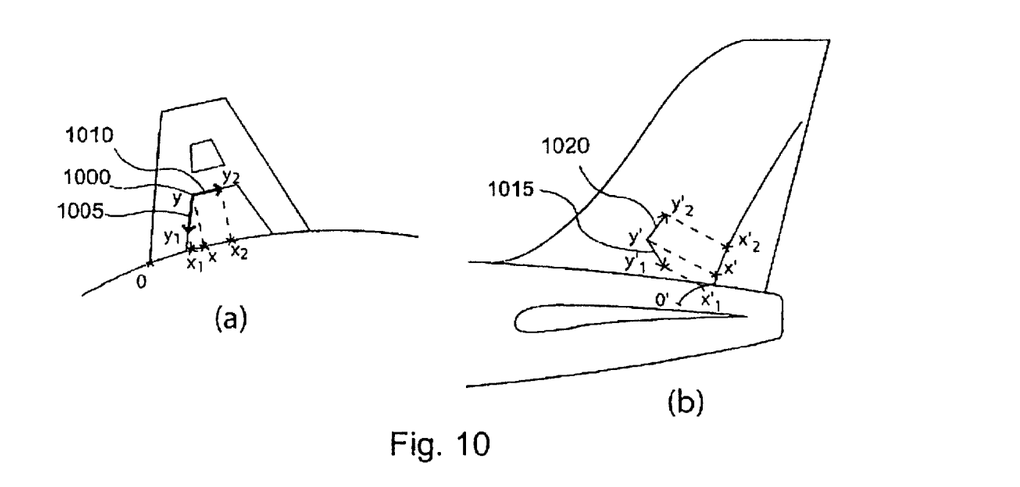

FIG. 10, comprising FIGS. 10a and 10b, illustrates the mechanism for projecting tangents. FIG. 10a represents part of the source image to be projected, on which there is selected a sampled point (point 1000). Point 1000 has coordinates (x, y). The tangents to the source image at point 1000 are represented by vectors 1005 and 1010. A point with coordinates $(x_1, y_1)$ is chosen on vector 1005 and a point with coordinates $(x_2, y_2)$ is chosen on vector 1010. The projection of the points with coordinates (x, y), $(x_1, y_1)$ and $(x_2, y_2)$ according to one of the methods described in the foregoing makes it possible to obtain the points with coordinates (x', y'), $(x_1', y_1')$ and $(x_2', y_2')$ respectively. With these last three points it is possible to construct vectors 1015 and 1020, corresponding to the projection of vectors 1005 and 1010 respectively.

When the points and the tangents have been projected, the projection of the source image may be obtained by connecting the projected points according to the connection of sampled points and the tangents. This reconstruction may be accomplished on the basis of a function of a computer-assisted design software adapted to connect points according to determined tangents.

Prior to the projection of sampled points onto the surface of the three-dimensional object, or during this projection, it is possible to transform the source image. In this way it is possible to use a transformation matrix in order, for example, to invert the source image horizontally and/or vertically. It is also possible to apply a scaling factor, which may or may not be linear, and more generally, all types of image transformations.

The projection of the two-dimensional representation of the decoration onto the surface of a three-dimensional object makes it possible to obtain preferably a file containing the coordinates of the projections of points of the two-dimensional representation of the decoration as well as the characteristics of these points. These characteristics may be, for example, the color associated with each point. This file may be used to obtain a visualization of the projection onto a digital model of the three-dimensional object, for example by using a computer-assisted design software. The file may also be used to trace the projection directly onto the real three-dimensional object to be decorated.

Naturally, to satisfy specific needs, a person skilled in the art of the invention will be able to apply modifications in the foregoing description.

The invention claimed is:

1. A method for projecting a two-dimensional pattern onto a surface of a three-dimensional object, the method comprising:
    defining a first and second original curve on the two-dimensional pattern and a first and second projection curve on the surface of the three-dimensional object, the at first and second original curve and the first and second projection curve each having a point of origin;
    determining a first, second and third projection ratio;
    selecting a point of the two-dimensional pattern;
    determining a first abscissa of a projection of a selected point on the first projection curve according to at least one abscissa of the selected point on the first original curve and according to the first projection ratio;
    determining a second abscissa of a projection of the selected point on the second projection curve according to at least one abscissa of the selected point on the second original curve and according to the second projection ratio;
    determining an ordinate of the projection of said selected point according to the ordinate of the selected point and the third projection ratio, the third projection ratio being different from the first and second projection ratio;
    determining an ordinate plane intersecting the three-dimensional object at a point of the first projection curve determined by the first abscissa of the projection of the selected point and a point of the second projection curve determined by the second abscissa of the projection of the selected point, the ordinate plane being defined by a predetermined direction; and
    determining, via a processor, the projection of the selected point onto the surface of the three-dimensional object according to the ordinate of the projection of the selected point, the intersection of the surface of the three-dimensional object with the ordinate plane, and the first and second projection curve.

2. The method according to claim 1, further comprising projecting:
    at least one tangent to the two-dimensional pattern at the selected point onto the surface of the three dimensional object.

3. The method according to claim 1, wherein the ordinate plane is normal to the first and second projection curve.

4. The method for projecting a two-dimensional pattern onto the surface of a three-dimensional object, the method comprising:

projecting at least one first point of the two-dimensional pattern onto the surface of the three-dimensional object according to the method of claim 3; and projecting at least one second point of the two-dimensional pattern onto the surface of the three-dimensional object.

5. The method according to claim 1, wherein the ordinate plane is parallel to a reference plane.

6. A method for projecting a two-dimensional pattern onto the surface of a three-dimensional object, comprising:

projecting at least one first point of the two-dimensional pattern is projected onto the surface of the three-dimensional object according to the method of claim 5; and projecting at least one second point of the two-dimensional pattern onto the surface of the three-dimensional object.

7. The method according to claim 1, wherein the ordinate of the projection of the selected point is defined by the ratio of the distances between the selected point and the points of the two original curves determined by the two abscissas of the selected point.

8. The method according to claim 7, wherein the third projection ratio is the ratio of a distance between the first abscissa and second abscissa, and the height of the two-dimensional pattern.

9. The method according to claim 1, further comprising:
transforming the two-dimensional pattern.

10. The method according to claim 1, wherein the three-dimensional object is a digital object or a real object.

11. The method according to claim 1, wherein the first projection curve and second projection curve define lower and upper limits of the projection of the two-dimensional pattern onto the surface of the three-dimensional object.

12. The method according to claim 1, wherein
the first projection ratio is the ratio of lengths of the first original curve and first projection curve, and
the second projection ratio is the ratio of lengths of the second original curve and second projection curve.

13. The method according to claim 12, wherein the third projection ratio is the ratio of a distance between the first abscissa and second abscissa, and the height of the two-dimensional pattern.

14. The method according to claim 1, wherein the third projection ratio is the ratio of a distance between the first abscissa and second abscissa, and the height of the two-dimensional pattern.

15. A device for projecting a two-dimensional pattern onto a surface of a three-dimensional object, the device comprising:

a processor programmed to
define a first and second original curve on the two-dimensional pattern and a first and second projection curve on the surface of the three-dimensional object, the first and second original curve and the first and second projection curve each having a point of origin;
determine a first, second and third projection ratio;
select a point of the two-dimensional pattern;
determine a first abscissa of a projection of a selected point on the first projection curve according to at least one abscissa of the selected point on the first original curve and according to the first projection ratio;
determine a second abscissa of a projection of the selected point on the second projection curve according to at least one abscissa of the selected point on the second original curve and according to the second projection ratio;
determine an ordinate of the projection of said selected point according to the ordinate of the selected point and the third projection ratio, the third projection ratio being different from the first projection ratio;
determine an ordinate plane intersecting the three-dimensional object at a point of the at least one projection curve determined by the first abscissa of the projection of the selected point and a point of the second projection curve determined by the second abscissa of the projection of the selected point, the ordinate plane being defined by a predetermined direction; and
determine the projection of the selected point onto the surface of the three-dimensional object according to the ordinate of the projection of the selected point, the intersection of the surface of the three-dimensional object with the ordinate plane, and the first and second projection curve.

16. A non-transitory computer-readable medium storing computer readable instructions thereon that when executed by a computer cause the computer to perform a method according to claim 1.

* * * * *